(12) United States Patent
Sasaki (10) Patent No.: US 11,476,735 B2
(45) Date of Patent: Oct. 18, 2022

(54) ELECTRIC WORK MACHINE

(71) Applicant: MAKITA CORPORATION, Anjo (JP)

(72) Inventor: Yoshinori Sasaki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 164 days.

(21) Appl. No.: 16/834,414

(22) Filed: Mar. 30, 2020

(65) Prior Publication Data

US 2020/0366161 A1 Nov. 19, 2020

(30) Foreign Application Priority Data

May 16, 2019 (JP) .............................. JP2019-093039

(51) Int. Cl.
| | | |
|---|---|---|
| *H02K 7/14* | (2006.01) | |
| *H02K 1/276* | (2022.01) | |
| *H02K 1/18* | (2006.01) | |
| *H02K 9/06* | (2006.01) | |
| *H02K 9/22* | (2006.01) | |
| *B25F 5/02* | (2006.01) | |
| *H02K 1/30* | (2006.01) | |

(52) U.S. Cl.
CPC .............. *H02K 7/145* (2013.01); *B25F 5/02* (2013.01); *H02K 1/18* (2013.01); *H02K 1/276* (2013.01); *H02K 1/30* (2013.01); *H02K 9/06* (2013.01); *H02K 9/223* (2021.01); *H02K 9/227* (2021.01)

(58) Field of Classification Search
CPC ............. H02K 7/145; H02K 1/18; H02K 9/06
USPC ................................ 310/50, 62, 63, 51, 60 R
See application file for complete search history.

(56) References Cited

U.S. PATENT DOCUMENTS

| | | | | |
|---|---|---|---|---|
| 2,825,827 | A * | 3/1958 | Luenberger | H02K 9/06 310/60 R |
| 3,344,291 | A * | 9/1967 | Pratt | H02K 7/145 310/43 |
| 3,848,145 | A * | 11/1974 | Goebel | H02K 9/06 312/236 |
| 2014/0251588 | A1* | 9/2014 | Tagawa | C08L 27/18 165/185 |

(Continued)

FOREIGN PATENT DOCUMENTS

| | | | | |
|---|---|---|---|---|
| CN | 101882818 | A | * | 11/2010 |
| JP | 2015147273 | A | * | 8/2015 |

(Continued)

OTHER PUBLICATIONS

Machine Translation WO2019155541 (Year: 2019).*
Machine Translation CN101882818 (Year: 2010).*

*Primary Examiner* — Jose A Gonzalez Quinones
(74) *Attorney, Agent, or Firm* — Oliff PLC (57) ABSTRACT

An electric work machine with a product structure that effectively reduces noise caused by a brushless motor without changing the motor specifications. A hammer drill includes a brushless motor including a stator including an insulator, a cylindrical stator core, and a coil wound around the stator core via the insulator, and a rotor rotatable relative to the stator, a cylindrical member fixed along an entire outer circumference of the stator core and made of material with a Young's modulus higher than a Young's modulus of the insulator, and a housing accommodating the brushless motor and the cylindrical member.

12 Claims, 10 Drawing Sheets

(56) References Cited

U.S. PATENT DOCUMENTS

2016/0118858 A1* 4/2016 Ojima .................. H02K 9/00
310/52

FOREIGN PATENT DOCUMENTS

| JP | 2019-004543 A | 1/2019 | | |
|---|---|---|---|---|
| WO | WO-2013164889 A1 * | 11/2013 | ............. | H02K 1/185 |
| WO | WO-2019155541 A1 * | 8/2019 | ............. | H02K 1/185 |

* cited by examiner

ELECTRIC WORK MACHINE

CROSS-REFERENCE TO RELATED APPLICATIONS

This application claims the benefit of priority to Japanese Patent Application No. 2019-093039, filed on May 16, 2019, the entire contents of which are hereby incorporated by reference.

BACKGROUND

1. Technical Field

The present invention relates to an electric work machine such as a hammer drill including a brushless motor.

2. Description of the Background

Electric work machines such as power tools typically include compact but high-power and durable brushless motors as their driving sources (e.g., refer to Japanese Unexamined Patent Application Publication No. 2019-4543).

BRIEF SUMMARY

Brushless motors may commonly suffer from noise from electromagnetic vibrations, which may be amplified when the rotational frequency of the rotor matches the resonant frequency of the stator and the stator resonates and deforms. Typical measures include modifying a motor by reshaping its rotor or stator or changing the motor rotational speed. However, to use the same motor in a range of products, such measures are to be taken to allow the same motor to be usable for multiple products. For a high-power brushless motor in which a large current flows, the stator generates heat that may cause an issue.

One or more aspects of the present invention are directed to an electric work machine having a product structure that effectively reduces noise caused by a brushless motor without changing the motor specifications.

Another aspect of the present invention provides an electric work machine that can effectively cool a stator.

A first aspect of the present invention provides an electric work machine, including:
a brushless motor including
a stator including
an insulator,
a cylindrical stator core, and
a coil wound around the stator core via the insulator, and
a rotor rotatable relative to the stator;
a cylindrical member fixed along an entire outer circumference of the stator core, the cylindrical member made of material with a Young's modulus higher than a Young's modulus of the insulator; and
a housing accommodating the brushless motor and the cylindrical member.

A second aspect of the present invention provides an electric work machine, including:
a brushless motor including
a stator including
an insulator,
a cylindrical stator core, and
a coil wound around the stator core via the insulator, and
a rotor rotatable relative to the stator;
a fan rotatable with rotation of the rotor; and
a heat dissipating member thermally connected to the stator core to regulate an air flow produced by rotation of the fan.

A third aspect of the present invention provides an electric work machine, including:
a brushless motor including
a stator including
an insulator,
a cylindrical stator core, and
a coil wound around the stator core via the insulator, and
a rotor rotatable relative to the stator;
a housing accommodating the brushless motor; and
a pressing member in contact with an end face of the stator core to press the stator core against the housing, the pressing member made of material with a Young's modulus higher than a Young's modulus of the insulator.

The electric work machine according to the above aspects of the present invention has a product structure that effectively reduces noise caused by the brushless motor without changing the motor specifications.

The electric work machine according to the above aspects of the present invention can effectively cool the stator.

DETAILED DESCRIPTION

An embodiment of the present invention will now be described with reference to the drawings.

Figure 1:
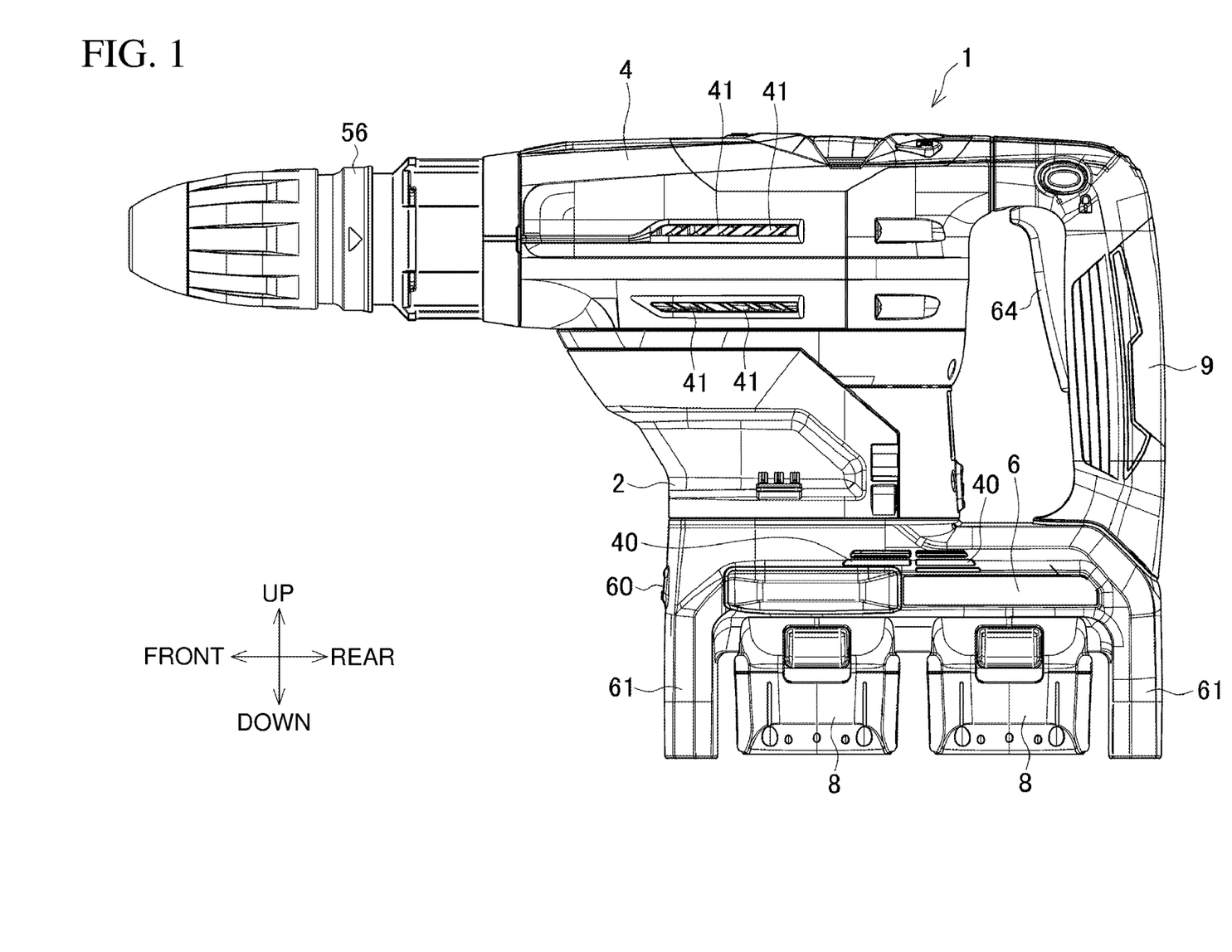
FIG. 1 is a side view of a hammer drill.
Figure 2:
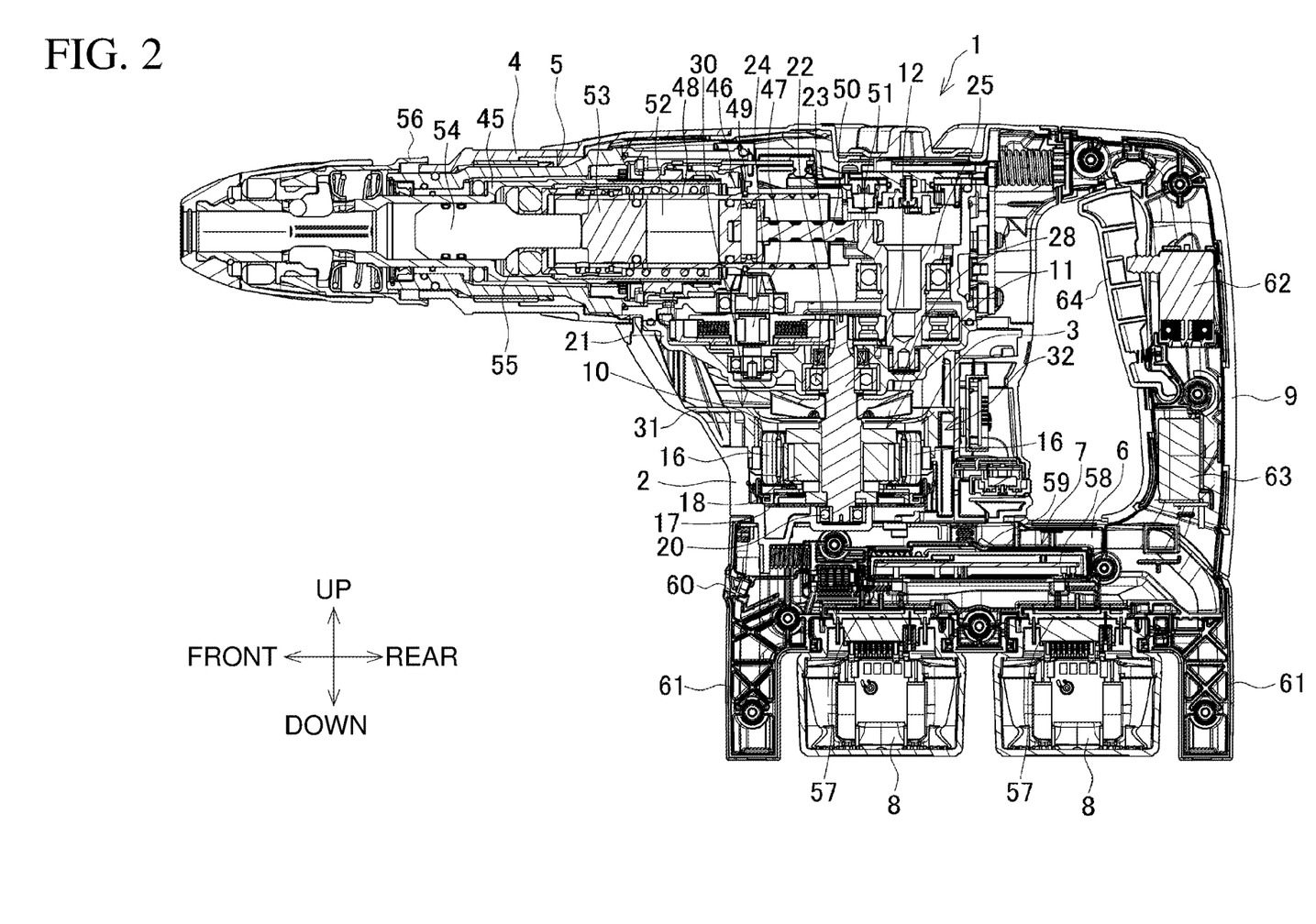
FIG. 2 is a longitudinal central sectional view of the hammer drill.

FIG. 1 is a side view of a hammer drill as an example of an electric work machine. FIG. 2 is a longitudinal central sectional view of the hammer drill.

A hammer drill 1 includes a motor housing 2, a brushless motor 3, an output housing 4, and an output unit 5. The motor housing 2 extends vertically and accommodates the brushless motor 3. The output housing 4 extends frontward and accommodates the output unit 5. The motor housing 2 includes a battery mount 6 in its lower portion. The battery mount 6 accommodates a controller 7. The battery mount 6 can receive two battery packs 8 under the controller 7. The output housing 4 has its rear connected to a handle 9, which extends vertically and is connected to the battery mount 6.

Figure 3:
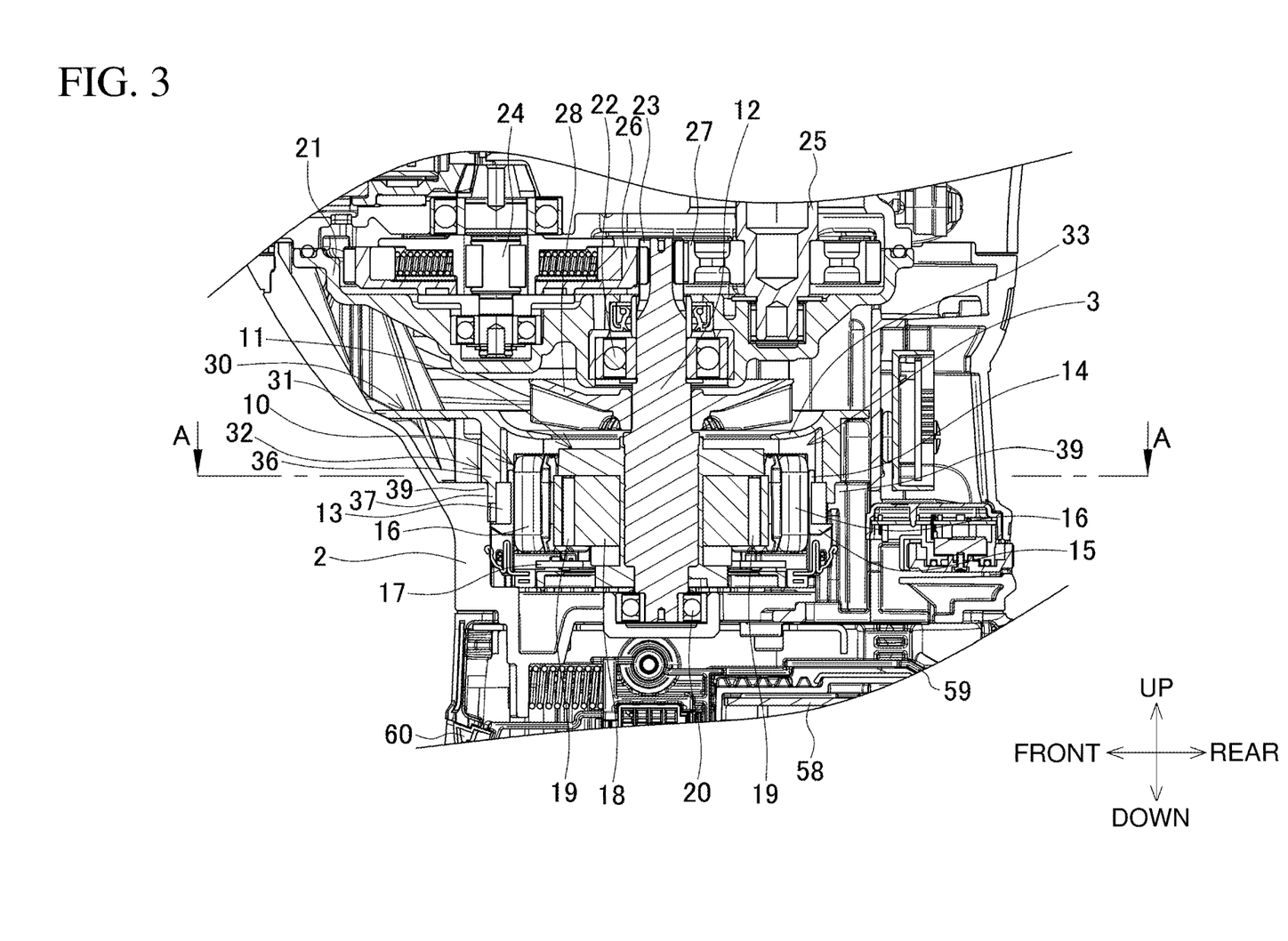
FIG. 3 is an enlarged view of a part including a brushless motor in FIG. 2.
Figure 4:
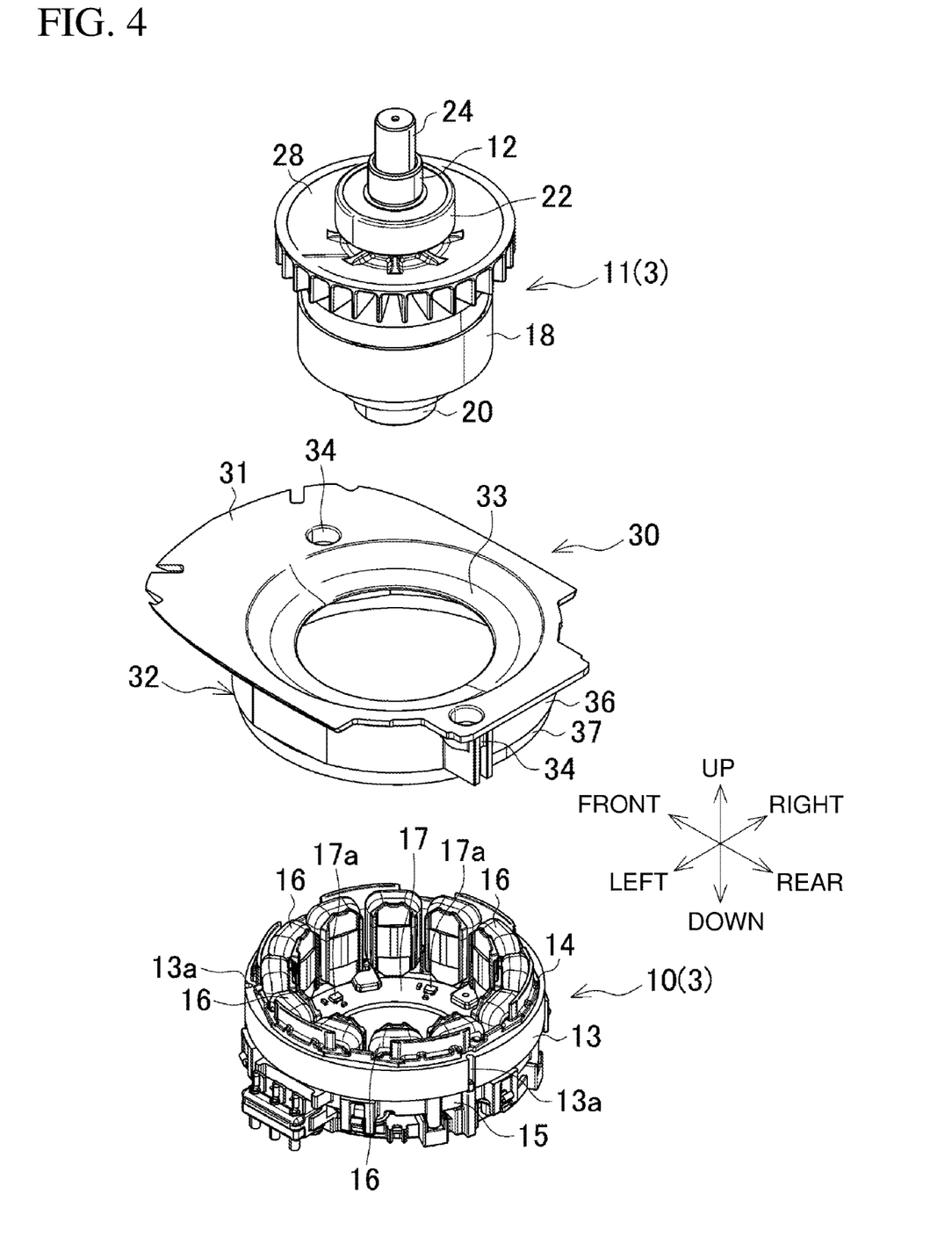
FIG. 4 is an exploded perspective view of the brushless motor and a baffle plate.

As also shown in FIGS. 3 and 4, the brushless motor 3 is an inner-rotor motor including a stator 10 and a rotor 11 inside the stator 10. The brushless motor 3 is accommodated in the motor housing 2 with the rotor 11 having its rotational shaft 12 extending vertically.

The stator 10 includes a stator core 13, an upper insulator 14, a lower insulator 15, and multiple coils 16. The upper insulator 14 and the lower insulator 15 are arranged on upper and lower ends of the stator core 13. The coils 16 are wound inside the stator core 13 via the upper and lower insulators 14 and 15. The lower insulator 15 receives a sensor circuit board 17 fixed on its lower end. The sensor circuit board 17 includes multiple rotation detecting elements 17a. The rotation detecting elements 17a detect the positions of permanent magnets 19 in a rotor core 18 (described later) and output rotation detection signals.

The rotor 11 includes the rotational shaft 12, the rotor core 18, and the multiple permanent magnets 19. The rotational shaft 12 extends along the axis of the rotor 11. The rotor core 18 is cylindrical and surrounds the rotational shaft 12. The rotor core 18 includes multiple electromagnetic steel plates stacked on one another. The permanent magnets 19 are placed in the rotor core 18.

The lower end of the rotational shaft 12 is supported by a bearing 20 on the bottom of the motor housing 2. The upper end of the rotational shaft 12 is supported by a bearing 22 included in a gear housing 21 inside the output housing 4, and protrudes into the gear housing 21. The rotational shaft 12 receives a pinion 23 on its upper end, and the pinion 23 meshes with a gear 26 on an intermediate shaft 24 at its front and a gear 27 on a crankshaft 25 at its rear. The rotational shaft 12 receives a centrifugal fan 28 under the bearing 22. A baffle plate 30 is located below the centrifugal fan 28 in the motor housing 2.

Figures 5A, 5B:
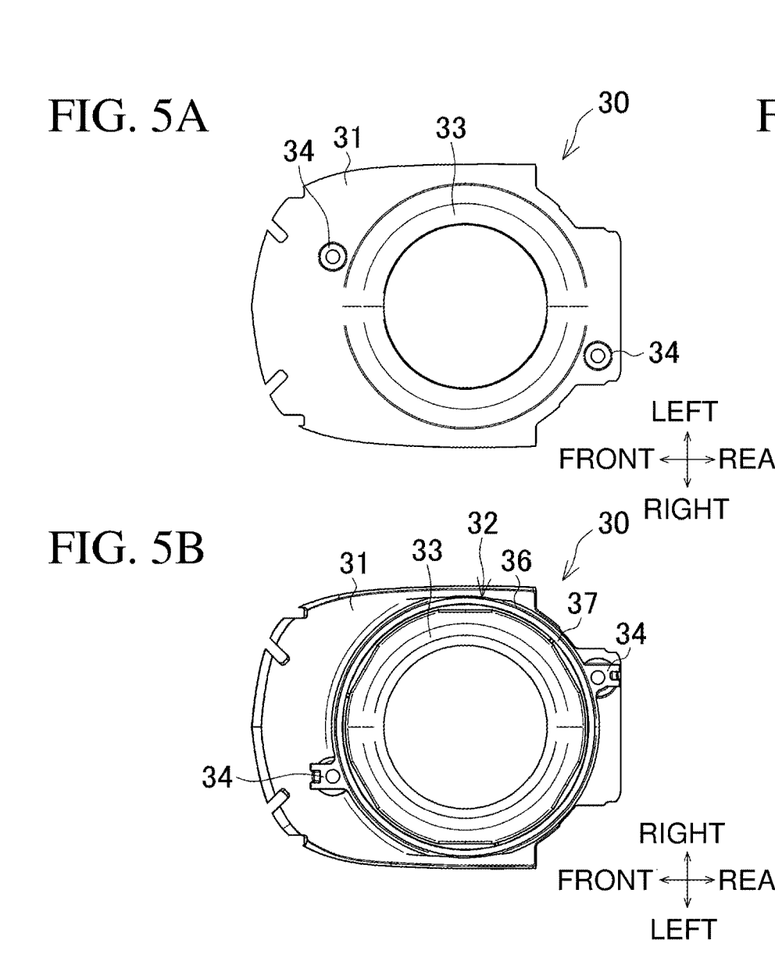
FIG. 5A is a plan view of the baffle plate.
FIG. 5B is a bottom view of the baffle plate.
Figure 5C:
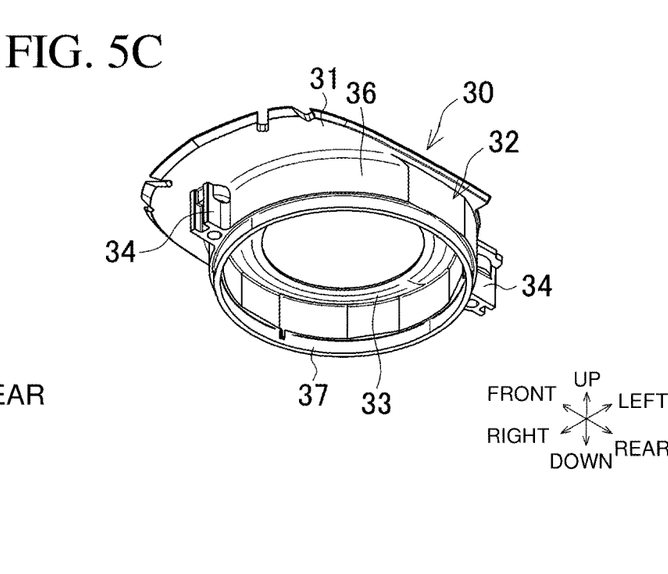
FIG. 5C is a perspective view of the baffle plate viewed from below.

The baffle plate 30 is formed from metal (aluminum in this example). As also shown in FIGS. 5A to 5C, the baffle plate 30 includes a partition 31 and a cylindrical portion 32. The partition 31 separates the interior of the motor housing 2 into upper and lower parts. The cylindrical portion 32 protrudes downward from the inner periphery of the partition 31. The inner periphery of the partition 31 is integral with a flow regulating portion 33 inside the cylindrical portion 32. The flow regulating portion 33 is annular and covers the outer circumference of the centrifugal fan 28 from below.

Figure 6:
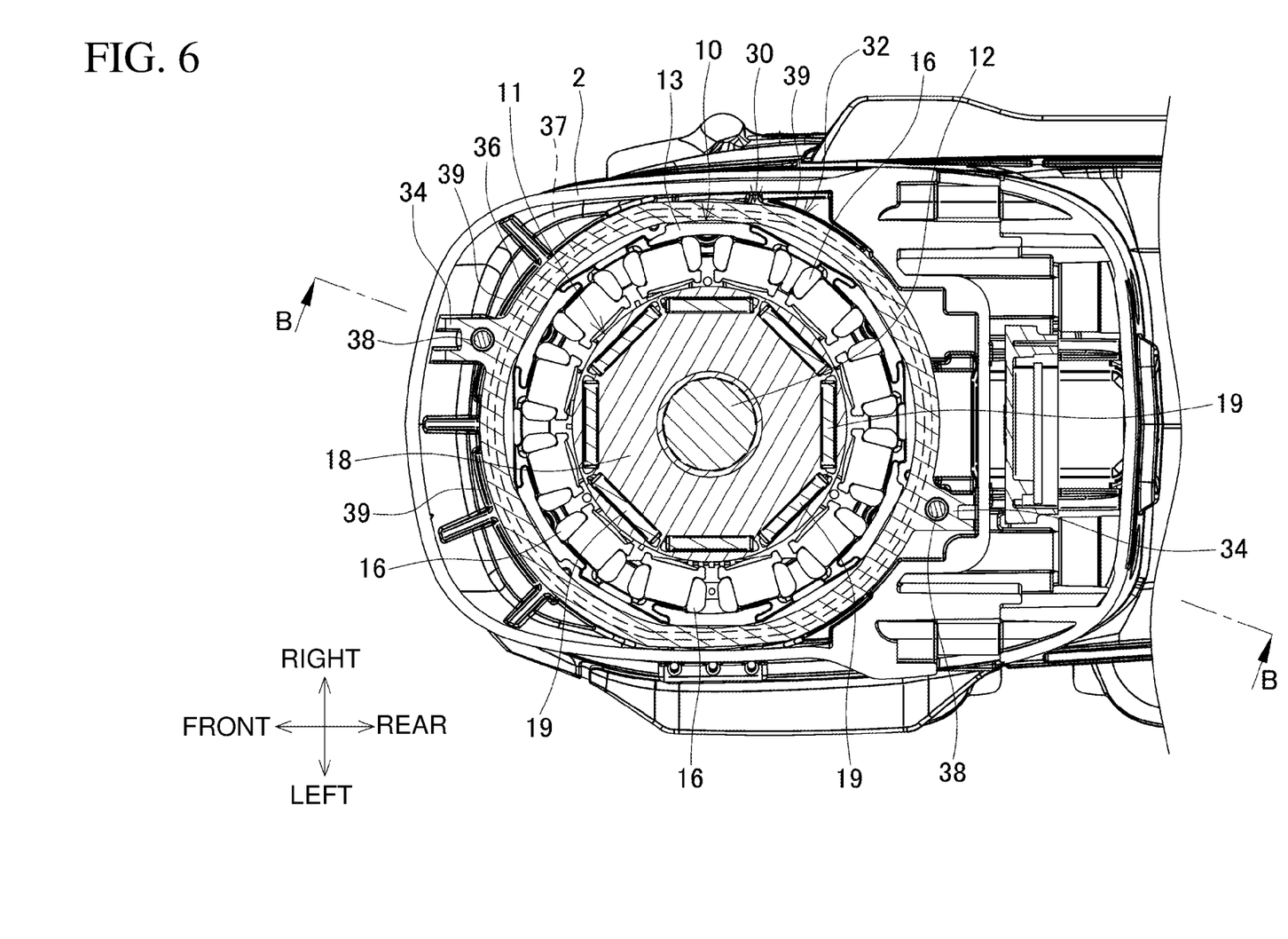
FIG. 6 is a cross-sectional view taken along line A-A in FIG. 3.
Figure 7:
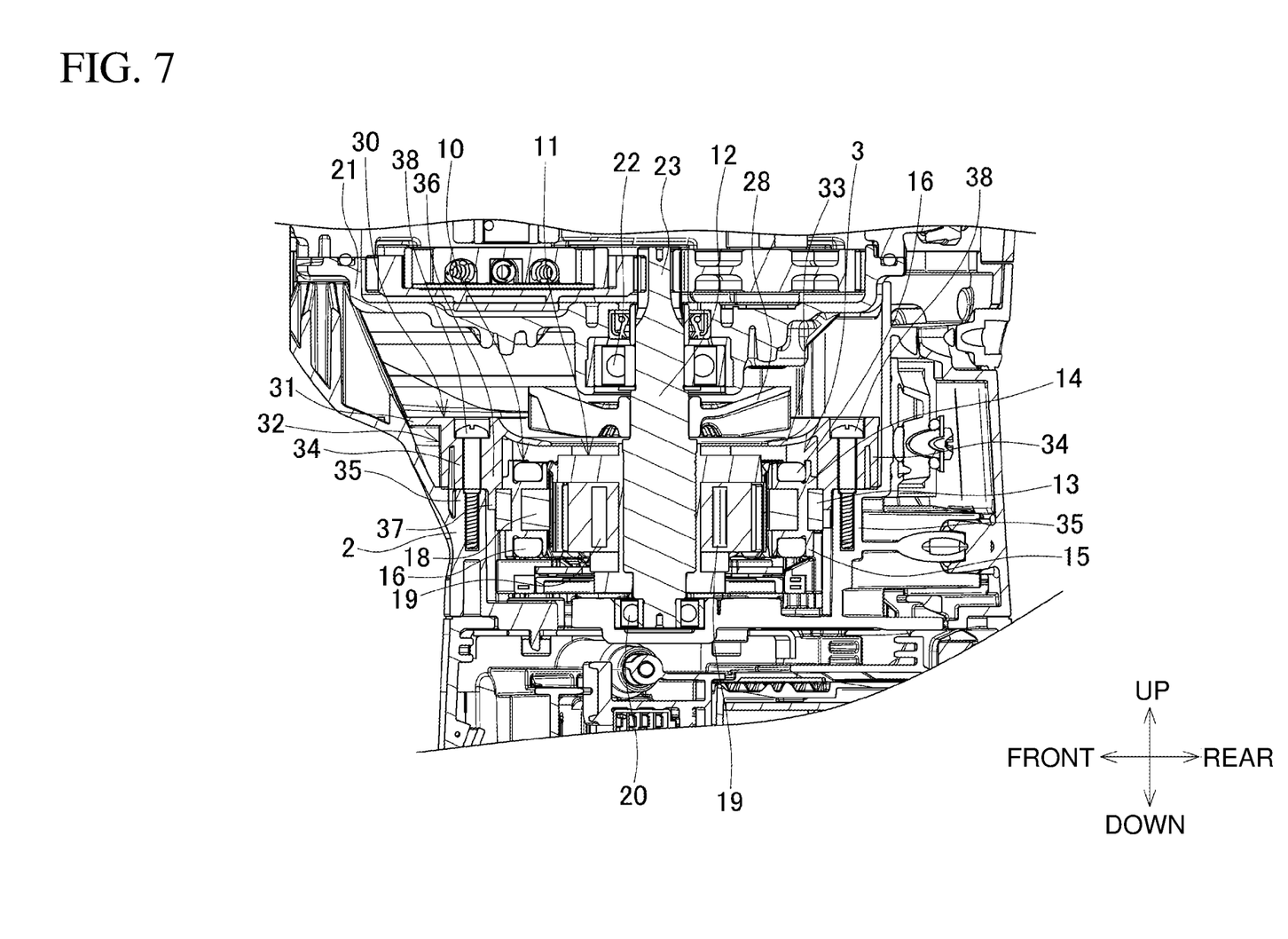
FIG. 7 is a cross-sectional view taken along line B-B in FIG. 6.

As also shown in FIG. 6, the cylindrical portion 32 is, on its outer surface, integral with two bosses 34 at positions symmetric to each other about the axis of the cylindrical portion 32. The bosses 34 each have a stepped-diameter through-hole, with a larger diameter opening in the partition 31. As shown in FIG. 7, the two bosses 34 are in contact from above with two corresponding screw bosses 35 in the motor housing 2.

The cylindrical portion 32 has an upper thick portion 36 and a lower thin portion 37. The thin portion 37 is integral with the thick portion 36 and extends downward from the radially middle of the lower surface of the thick portion 36. In the assembled state, the outer lower surface of the thick portion 36 is in contact with both the upper surfaces of the screw bosses 35 and the upper surfaces of receiving ribs 39. The receiving ribs 39 are arranged concentrically inside the screw bosses 35 and stand erect with the same height. In this state, the inner lower surface of the thick portion 36 is in contact with the upper surface of the stator core 13 to be vertically positioned. The thin portion 37 in this state covers the entire outer circumference of the stator core 13 except its lower end part, and is in close contact with the stator core 13 while being lightly press-fitted with the stator core 13.

Two screws 38 are placed through the two bosses 34 from above to fasten the baffle plate 30 to the screw bosses 35 in the motor housing 2. In this state, the stator core 13 is held with its entire outer circumference by the cylindrical portion 32, while being pressed from above by the screw bosses 35 and the receiving ribs 39.

As shown in FIG. 1, the battery mount 6 has multiple inlets 40 in its right and left side surfaces, which are outside the right and the left of the controller 7. The output housing 4 has multiple outlets 41 in its right and left sides above the centrifugal fan 28. The outlets 41 communicate with a portion outside the centrifugal fan 28 through the gear housing 21 and the output housing 4.

As shown in FIG. 2, the output unit 5 includes a rotatable, cylindrical tool holder 45 extending in the front-rear direction. The tool holder 45 has a bevel gear 46 externally mounted on its rear end and meshed with a bevel gear 47 on the upper end of the intermediate shaft 24. The tool holder 45 receives a cylinder 48. The cylinder 48 contains a piston 49 connected to a crank pin 51 via a connecting rod 50. The crank pin 51 is decentered on the upper end of the crankshaft 25.

In front of the piston 49, the cylinder 48 contains a striker 53 across an air chamber 52 in a reciprocable manner. In front of the striker 53, the tool holder 45 contains an impact bolt 54 in a reciprocable manner. When a tip tool such as a drill bit is inserted into the distal end of the tool holder 45, the rear end of the tip tool forces the impact bolt 54 rearward to a receiving ring 55 in front of the cylinder 48, and protrudes into the cylinder 48. An operational sleeve 56 is externally mounted on the front end of the tool holder 45 to attach or detach the tip tool.

The battery mount 6 includes two terminal mounts 57 arranged in the front-rear direction. The battery pack 8 is slidably mountable on each terminal mount 57 in the lateral direction. The controller 7 is accommodated above the terminal mount 57. The controller 7 includes a control circuit board 58 on which a microcomputer (not shown) and switching elements (not shown) are mounted. The controller 7 is supported by a rib 59 standing erect on the inner surface of the battery mount 6 and extends in the front-rear direction. In front of the controller 7, a lamp 60 is located. The lamp 60 uses a light-emitting diode (LED) to illuminate in front of the output unit 5. In front of and behind the battery mount 6, guard plates 61 protrude downward. The guard plates 61 cover the front and the rear of the mounted battery packs 8.

The handle 9 contains a switch 62 and a capacitor 63. The switch 62 and the capacitor 63 are electrically connected to the controller 7. The switch 62 has a plunger protruding frontward, to which a switch lever 64 is attached.

When the switch lever 64 is depressed to turn on the switch 62 with the hand holding the handle 9 of the hammer drill 1 in the present embodiment, the battery packs 8 power the brushless motor 3 to rotate the rotational shaft 12. More specifically, the rotation detecting elements 17a in the sensor circuit board 17 output rotation detection signals indicating the positions of the permanent magnets 19 in the rotor 11, and the microcomputer in the controller 7 receives the signals to determine the rotational state of the rotor 11. The microcomputer in the controller 7 then controls the on-off state of each switching element in accordance with the determined rotational state, and applies a current sequentially through the coils 16 in the stator 10 to rotate the rotor 11.

When the rotational shaft 12 rotates, the intermediate shaft 24 turns via the gear 26 at a reduced speed to rotate the tool holder 45 together with the tip tool via the bevel gears 47 and 46. The crankshaft 25 simultaneously turns via the gear 27 at a reduced speed, causing the piston 49 to reciprocate within the cylinder 48 via the connecting rod 50. This causes the striker 53 to move back and forth across the air chamber 52. The striker 53 thus strikes the tip tool with the impact bolt 54.

The centrifugal fan 28 rotating with the rotation of the rotational shaft 12 draws air in through the inlets 40. The air first comes in contact with the controller 7 to cool the controller 7 (the control circuit board 58) and passes through the motor housing 2 between the stator 10 and the rotor 11 to cool the stator 10 and the rotor 11. The air then travels radially above the flow regulating portion 33 of the baffle plate 30 and passes between the output housing 4 and the gear housing 21 before exiting through the outlets 41.

When the rotor 11 rotates at the same frequency as the resonant frequency of the stator 10, the stator 10 resonates and may deform greatly. However, the outer circumference of the stator core 13 is clamped by the thin portion 37 of the cylindrical portion 32. The stator core 13 is also pressed against the motor housing 2 by the baffle plate 30 from above. This increases the rigidity of the overall stator core 13, shifting the resonant frequency to a higher frequency to avoid resonance (deformation). This structure thus reduces electromagnetic noise resulting from resonance.

The entire outer circumference of the stator core 13 is in close contact with the thin portion 37. Thus, when the stator 10 heats up, the generated heat is transferred from the thin portion 37 to the partition 31 through the thick portion 36, facilitating heat dissipation. This enables effective cooling.

Changes in the resonant frequency of the baffle plate 30 in the present embodiment will now be described. The stator core 13 has an outer diameter of 80 mm and an axial length of 10 mm. The baffle plates 30, which are formed from aluminum and have the thin portions 37 with different lengths of 0 (no thin portion), 2, and 9 mm, were tested for their resonant frequencies at different vibration modes.

As shown in Table 1 below, a resin baffle plate without a thin portion has a 100% resonant frequency. The 0-mm thin portion 37 had 142% and 189% resonant frequencies at the second-order ring mode. The 2-mm thin portion 37 had 155% and 199% resonant frequencies at the second-order ring mode. The 9-mm thin portion 37 had 162% and 202% resonant frequencies at the second-order ring mode. For each length, changes (increases) in the resonant frequency were observed.

The 0-mm thin portion 37 had 133% and 141% resonant frequencies at the third-order ring mode. The 2-mm thin portion 37 had 143% resonant frequencies at the third-order ring mode. The 9-mm thin portion 37 had 145% and 147% resonant frequencies at the third-order ring mode. For each length, changes (increases) in the resonant frequency were observed.

Each vibration mode has two rates corresponding to two peaks that result from three rectangular grooves 13*a* (FIG. 4) on the outer circumference of the stator core 13.

TABLE 1

| Vibration mode | Resin (with no thin portion) | Aluminum (with 0-mm thin portion) | Aluminum (with 2-mm thin portion) | Aluminum (with 9-mm thin portion) |
|---|---|---|---|---|
| 2nd-order ring mode | 100% | 142% | 155% | 162% |
| 2nd-order ring mode | 100% | 189% | 199% | 202% |
| 3rd-order ring mode | 100% | 133% | 143% | 145% |
| 3rd-order ring mode | 100% | 141% | 143% | 147% |

The hammer drill 1 in the present embodiment includes the brushless motor 3 including the stator 10 including the cylindrical stator core 13 around which the coils 16 are wound via the upper and lower insulators 14 and 15, and the rotor 11 rotatable relative to the stator 10, the cylindrical portion 32 (cylindrical member) fixed along the entire outer circumference of the stator core 13 and formed from aluminum, which has a Young's modulus higher than that of the upper and lower insulators 14 and 15, and the motor housing 2 (housing) accommodating the brushless motor 3 and the cylindrical portion 32. The stator 10 can thus avoid resonance without reshaping of the stator 10 and the rotor 11 or a change in the motor rotational speed. Thus, the hammer drill 1 has a product structure that effectively reduces noise caused by the brushless motor 3 without changing the motor specifications.

In particular, the cylindrical portion 32 is mounted in the motor housing 2 to regulate the axial movement of the stator core 13. Thus, the hammer drill 1 has an efficient structure in which the cylindrical portion 32 is also usable for installation of the stator 10, thus increasing the resonance frequency of the stator 10.

The hammer drill 1 also includes the centrifugal fan 28 (fan) that rotates with the rotor 11, and the baffle plate 30 (flow regulating member) that is integral with the cylindrical portion 32 and regulates an air flow produced by the rotation of the centrifugal fan 28. Thus, the baffle plate 30 can easily incorporate the cylindrical portion 32 and facilitates installation.

The cylindrical portion 32 is formed from aluminum (metal). The material provides rigidity sufficient to reduce noise and is expected to achieve cooling.

Figure 8:
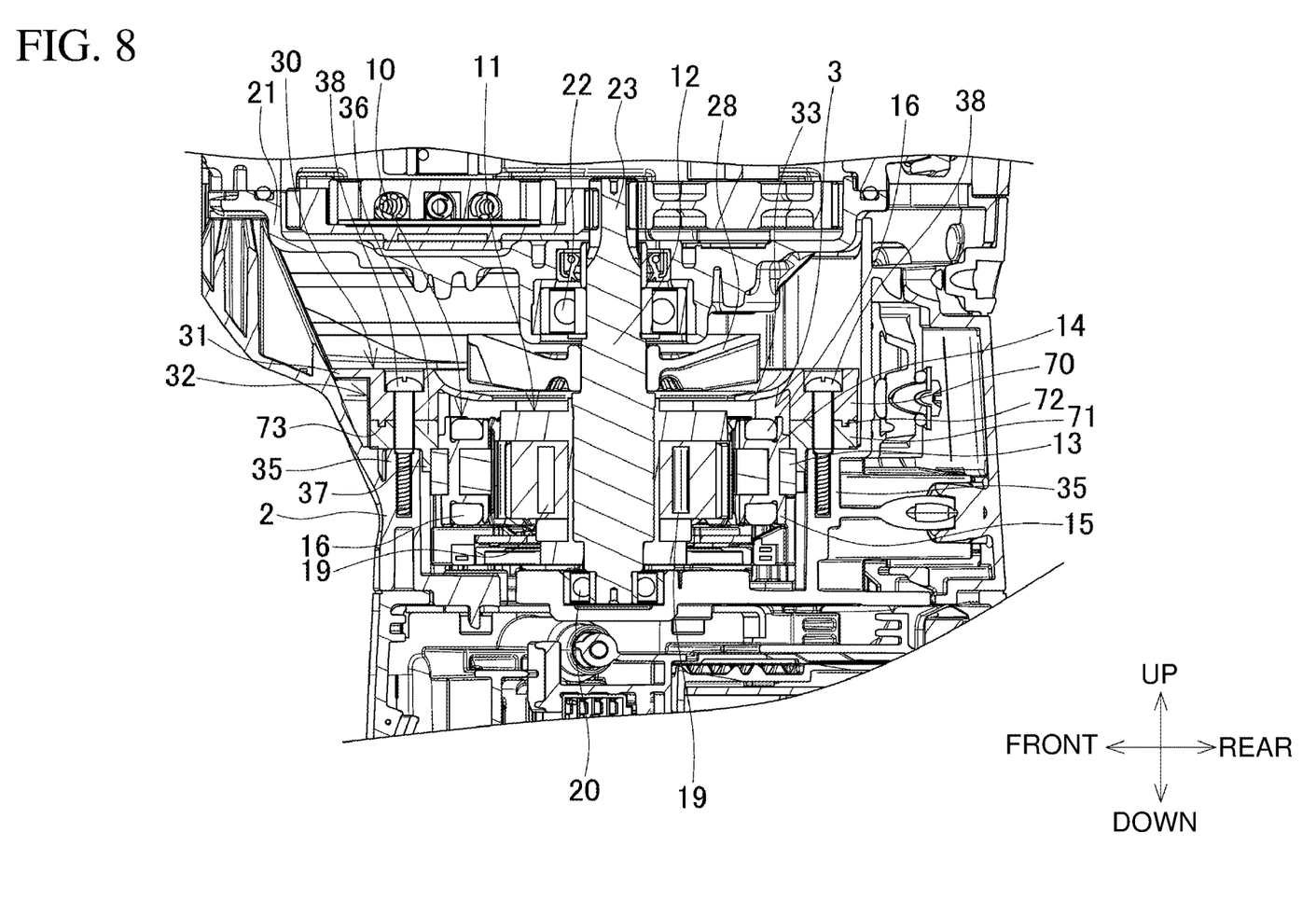
FIG. 8 is a cross-sectional view of an electric work machine according to a modification with a baffle plate divided into upper and lower parts.

In the present embodiment, the metal baffle plate 30 is mounted in the resin motor housing 2 without contact with the metal housing. When the baffle plate 30 can come into contact with another metal component, as shown in FIG. 8, the baffle plate 30 may be divided into an upper part 70 and a lower part 71 along the thick portion 36 of the cylindrical portion 32. The upper part 70 is formed from resin and includes the partition 31 and the upper half of the thick portion 36. The lower part 71 is formed from metal and includes the lower half of the thick portion 36 and the thin portion 37. The upper part 70 and the lower part 71 are fastened together with the screws 38. In this example, one of the upper part 70 and the lower part 71 may have a circular ridge 72 on its contact surface, and the other may have a circular recess 73. The ridge 72 and the recess 73 are to be fitted with each other for positioning.

Figure 9:
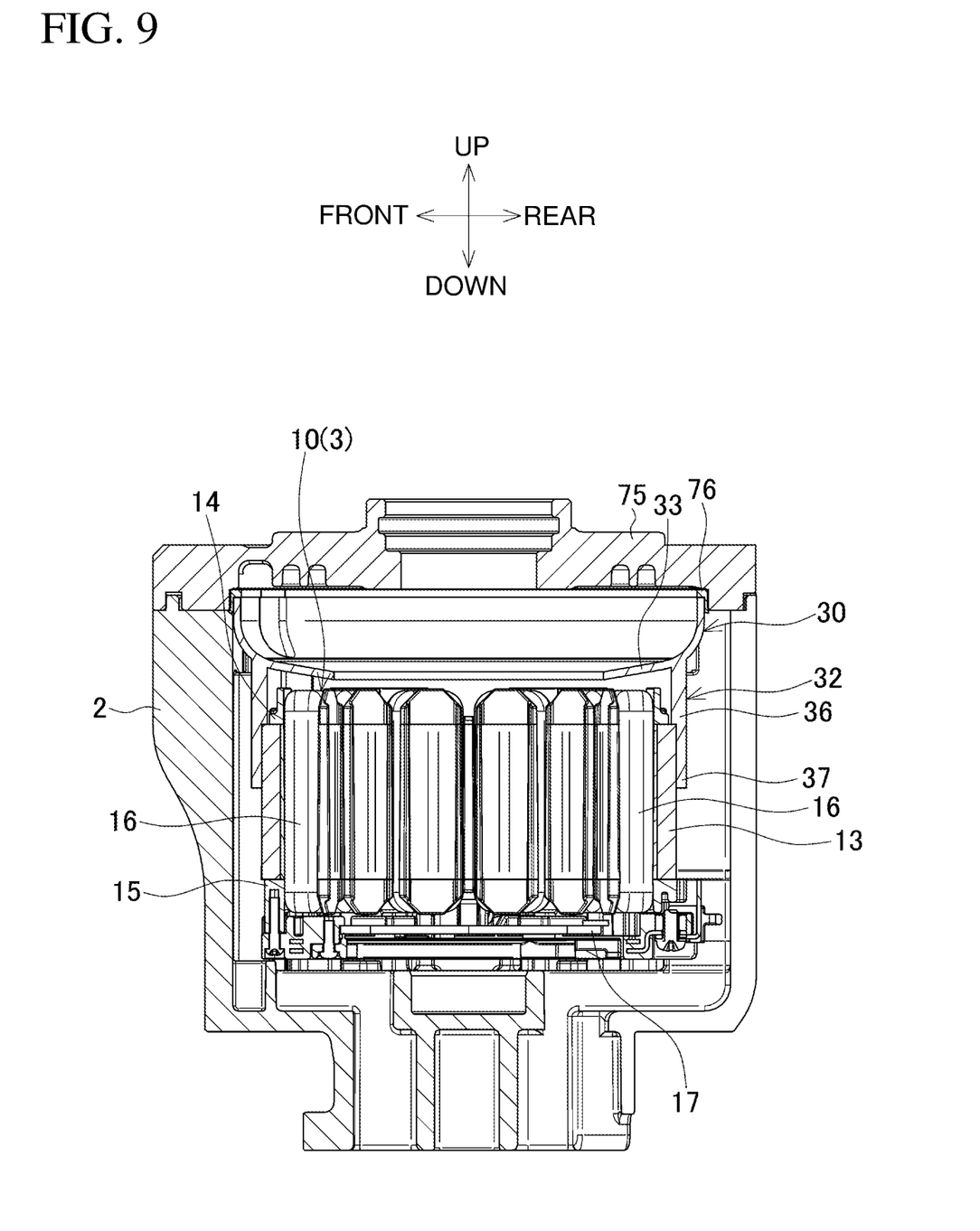
FIG. 9 is a cross-sectional view of an electric work machine according to a modification with a metal gear housing mounted on a motor housing.

In another example, as shown in FIG. 9, an electric work machine may have a metal gear housing 75 mounted on the motor housing 2. In this case, an insulating member 76 such as rubber may be placed between the gear housing 75 and the baffle plate 30 along the entire periphery to achieve insulation. The insulating member 76 between the cylindrical portion 32 and the metal gear housing 75 achieves insulation for the baffle plate 30 formed from metal.

In each of the present embodiment and modifications, the insulating member 76 or a cooling member may be placed between the coils 16 and the metal baffle plate 30 to achieve insulation or cooling between them.

Although the cylindrical portion 32 in the present embodiment is integral with the baffle plate 30, a cylindrical portion 32 separate from the baffle plate 30 may surround the outer circumference of the stator core 13 alone to reduce vibrations.

The cylindrical portion 32 may not be formed from aluminum (Young's modulus of 70,000 MPa). A resin (PA6GF30, wet) has a Young's modulus of about 5,000 MPa. Thus, any material with a Young's modulus of 10,000 MPa or more may be used. Examples of materials with 10,000 MPa or more include PA6GF45 (absolute dry), and examples of materials with 35,000 MPa or more include magnesium (40,000 MPa), zinc (80,000 MPa), copper (100,000 MPa), brass (100,900 MPa), and iron (205,000 MPa). Each of these materials may be used alone or in combination.

The hammer drill 1 in the present embodiment includes the brushless motor 3 including the stator 10 including the cylindrical stator core 13 around which the coils 16 are wound via the upper and lower insulators 14 and 15, and the rotor 11 rotatable relative to the stator 10, the centrifugal fan 28 (fan) rotatable with the rotation of the rotor 11, and the baffle plate 30 (heat dissipating member) thermally connected to the stator core 13 to regulate an air flow produced by the rotation of the centrifugal fan 28. When the stator 10 heats up, the generated heat is transferred from the cylindrical portion 32 to the partition 31, facilitating heat dissipation and effectively cooling the stator 10. This structure is particularly effective and actively cools the stator 10 when the resistance of the battery packs 8 decreases to allow a large current to flow.

In particular, the baffle plate 30 includes the cylindrical portion 32 (cylindrical member) fixed along the entire outer circumference of the stator core 13. This enables heat from the stator core 13 to be efficiently transferred and dissipated.

The baffle plate 30 is formed from aluminum, which has a thermal conductivity of 15 W/m·K or more. The baffle plate 30 thus achieves effective cooling.

Polyethylene has a thermal conductivity of 0.41 W/m·K, and an epoxy resin has a thermal conductivity of 0.21 W/m·K. Thus, the heat dissipating member may be formed from a material with a thermal conductivity of 15 W/m·K or more. Examples of materials with a thermal conductivity of 15 W/m·K or more include stainless steel (17 W/m·K), iron (84 W/m·K), brass (106 W/m·K), and copper (403 W/m·K). Aluminum has 236 W/m·K. Each of these materials may be used alone or in combination.

To improve heat dissipation, the cylindrical member may have multiple projections such as fins on its outer circumference, or may be colored black by anodic oxidation. A cooling sheet may also be attached.

Figure 10:
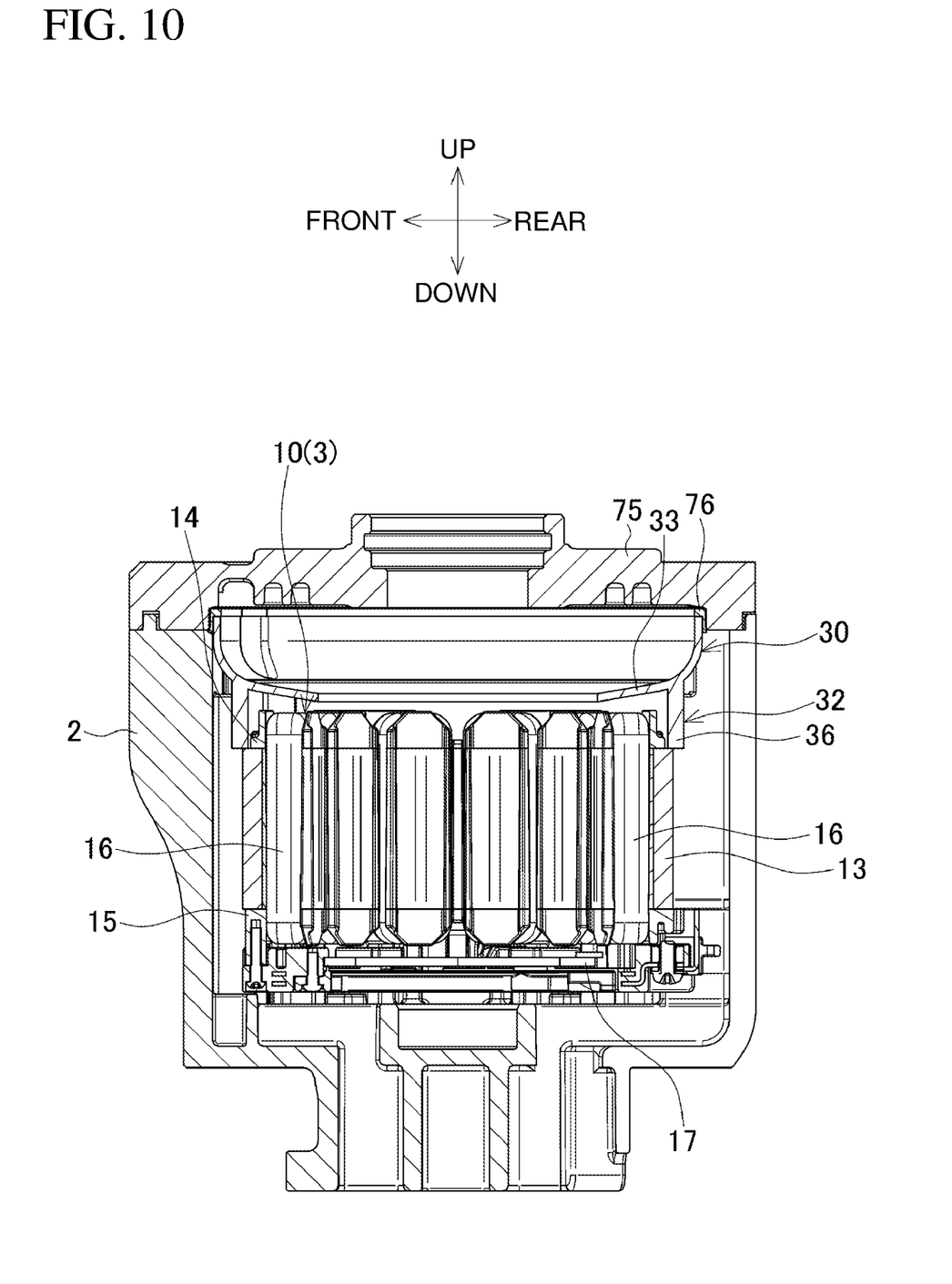
FIG. 10 is a cross-sectional view of an electric work machine according to a modification with a baffle plate in FIG. 9 fixing a stator core by pressing an end face of the stator core.

Noise reduction by avoiding the resonance of the stator may be achieved by not only the cylindrical member clamping the outer circumference of the stator core but also by the baffle plate simply pressing the end face of the stator core against the housing. FIG. 10 shows a modification in which a baffle plate 30 includes a cylindrical portion 32 having a thick portion 36. The lower end of the thick portion 36 is in contact with the end face of the stator core 13 to mount the baffle plate 30 in the motor housing 2 and also press the stator core 13 against screw bosses or other areas of the motor housing 2. This increases the resonant frequency of the stator 10.

The electric work machine in the present modification includes the brushless motor 3 including the stator 10 including the cylindrical stator core 13 around which the coils 16 are wound via the upper and lower insulators 14 and 15, and the rotor 11 rotatable relative to the stator 10, the motor housing 2 (housing) accommodating the brushless motor 3, and the baffle plate 30 (pressing member) in contact with the end face of the stator core 13 to press the stator core 13 against the motor housing 2. The baffle plate 30 is formed from aluminum, which has a Young's modulus higher than that of the upper and lower insulators 14 and 15. The stator 10 can thus avoid resonance without the stator 10 and the rotor 11 being reshaped or the motor rotational speed being changed. Thus, the electric work machine has a product structure that effectively reduces noise caused by the brushless motor 3 without changing the motor specifications.

The pressing member is not limited to a baffle plate and may be any member that, within the housing, presses the stator core against the housing. The pressing member may also be formed from a non-aluminum material that has a Young's modulus higher than that of the insulators.

In addition, the position and orientation of the brushless motor may be other than those described in the embodiment or the modifications. For example, the brushless motor may face frontward, diagonally outward, rightward, or leftward. The baffle plate may also have more bosses and screw bosses or include a different number of receiving ribs or receiving ribs of another shape.

The power tool is not limited to a hammer drill but may be another tool such as an impact driver, a circular saw, or a grinder. Additionally, an electric work machine to which the present invention is applicable is not only a power tool but also other machines such as a lawn mower or a compressor.

REFERENCE SIGNS LIST 1 hammer drill
2 motor housing
3 brushless motor
4 output housing
5 output unit
6 battery mount
7 controller
8 battery pack
10 stator
11 rotor
12 rotational shaft
13 stator core
14 upper insulator
15 lower insulator
16 coil
17 sensor circuit board
18 rotor core
19 permanent magnet
21, 75 gear housing
28 centrifugal fan
30 baffle plate
31 partition
32 cylindrical portion
33 flow regulating portion
34 boss
36 thick portion
37 thin portion
38 screw
39 receiving rib
40 inlet 41 outlet
45 tool holder
49 piston
53 striker
54 impact bolt
58 control circuit board
70 upper part
71 lower part
76 insulating member

What is claimed is:

1. An electric work machine, comprising:
a brushless motor including
a stator including
an insulator,
a cylindrical stator core, and
a coil wound around the stator core via the insulator, and
a rotor rotatable relative to the stator;
a cylindrical member (1) fixed around an outer circumference of the stator core and (2) made of material with a Young's modulus higher than a Young's modulus of the insulator, the cylindrical member including
a thick portion, and
a thin portion extending downward from a radially middle of a lower surface of the thick portion such that radial centers of the thin portion and the thick portion are at a same radius from a longitudinal axis of the cylindrical member; and
a housing accommodating the brushless motor and the cylindrical member,
wherein the thick portion has a larger radial diameter than the thin portion.

2. The electric work machine according to claim 1, wherein
the cylindrical member is mounted in the housing and configured to regulate axial movement of the stator core.

3. The electric work machine according to claim 1, further comprising:
a fan rotatable with rotation of the rotor; and
a flow regulating member integral with the cylindrical member to regulate an air flow produced by rotation of the fan.

4. The electric work machine according to claim 1, wherein
the cylindrical member is made of metal.

5. The electric work machine according to claim 4, further comprising:
an insulating member between the cylindrical member and the housing,
wherein the housing is made of metal.

6. An electric work machine, comprising:
a brushless motor including
a stator including
an insulator,
a cylindrical stator core, and
a coil wound around the stator core via the insulator, and
a rotor rotatable relative to the stator;
a cylindrical member (1) fixed around an outer circumference of the stator core and (2) made of material with a Young's modulus higher than a Young's modulus of the insulator;
a housing accommodating the brushless motor and the cylindrical member; and
a fan rotatable with rotation of the rotor; wherein:
the cylindrical member includes:
a flow regulating member configured to regulate an air flow produced by rotation of the fan;
a cylindrical portion with a longitudinal axis that is co-linear with a rotating axis of the rotor; and
a partition that extends outwardly from the cylindrical portion;
the partition includes at least one screw boss with a longitudinal axis parallel to the rotating axis; and
a screw is received in the screw boss to attach the cylindrical member to the housing.

7. The electric work machine according to claim 2, further comprising:
a fan rotatable with rotation of the rotor; and
a flow regulating member integral with the cylindrical member to regulate an air flow produced by rotation of the fan.

8. The electric work machine according to claim 2, wherein
the cylindrical member is made of metal.

9. The electric work machine according to claim 3, wherein
the cylindrical member is made of metal.

10. An electric work machine, comprising:
a brushless motor including
a stator including
an insulator,
a cylindrical stator core, and
a coil wound around the stator core via the insulator, and
a rotor rotatable relative to the stator;
a housing accommodating the brushless motor; and
a pressing member (1) having 360° of a circumference of a surface in contact with 360° of a circumference of an upper end face of the stator core to press the stator core at an outer surface of the insulator against the housing and (2) made of material with a Young's modulus higher than a Young's modulus of the insulator.

11. The electric work machine according to claim 1, wherein
an inner lower surface of the thick portion is in contact with an upper surface of the stator.

12. The electric work machine according to claim 1, further comprising:
a screw fixing the cylindrical member to the housing.

* * * * *